UNITED STATES PATENT OFFICE.

CARL LÖCHERT, OF BERLIN, GERMANY.

CEMENT FOR JOINING THE ENDS OF DRIVING-BELTS.

SPECIFICATION forming part of Letters Patent No. 446,458, dated February 17, 1891.

Application filed September 15, 1890. Serial No. 365,082. (No specimens.)

*To all whom it may concern:*

Be it known that I, CARL LÖCHERT, a subject of the German Emperor, residing at Berlin, Germany, have invented a new and Improved Mastic for Joining Driving-Belts, of which the following is a specification.

This invention relates to an improved mastic or cement for joining the ends of driving-belts, which were hitherto generally joined by mechanical means, such as sewing, bands, rivets, screws, or buckles.

The method of preparing my improved mastic or cement is as follows: First I soften during eight to ten hours five kilograms of Cologne glue in three times the quantity of cold water and boil the solution in a water bath under constant agitation till the glue is completely clear and nearly solid. Then I add three and three-quarters liters of vinegar-spirit previously heated and mixed with the glue under agitation. This vinegar-spirit is a vinegar made from alcohol or spirit, and contains ten to twelve per cent. of acetic acid. I further add, under continuous agitation, five grams of pulverized alum, one-eighth liter of spirits of turpentine, twenty grams of a solution of shellac dissolved in one-tenth liter of alcohol of ninety-six per cent., and one gram of chromate of potassium dissolved in one-tenth liter of hot vinegar-spirit. The whole mixture is then further boiled under constant agitation for about one hour. A suitable pigment may be added to the mass while boiling to give to it the color of a belt. The mass, after cooling, is of a gelatinous nature, and becomes fluid by heating. The ends of the belt to be joined are tapered in the direction of their length, so that when superposed they will make up the original thickness of the belt. These ends are next coated with the heated and fluid mass, and after being superposed are subjected to a strong pressure by a screw-clamp between two suitable plates for about five minutes.

Before the belt is put to use it should be allowed to cool for about five to ten minutes, and belts which are strongly impregnated with grease should not be put to use until the lapse of a somewhat longer period. Straps or belts having worn ends may be readily joined by my improved mastic or cement in the same manner as above described. The joint formed by my cement is perfectly resistant to every influence of temperature, being neither altered by heat, cold, or moisture. The cement does not suffer from grease, does not become brittle, but always remains supple, and when the leather stretches the mastic distends along with it. There are no projections, no straps, rivets, screws, buckles, or the like that would make the surfaces uneven, and consequently the machine will work with perfect regularity and smoothness. Double and triple belts may likewise be united by the mastic.

What I claim is—

A mastic or cement for joining straps or driving-belts, consisting of a mixture of glue, vinegar-spirit, alum, spirits of turpentine, shellac, and chromate of potassium, substantially as specified.

In testimony whereof I hereunto sign my name, in the presence of two subscribing witnesses, this 1st day of September, 1890.

CARL LÖCHERT.

Witnesses.
CARL MEHNERT,
DAVID VOSS.